United States Patent [19]

Frost

[11] Patent Number: 4,844,495
[45] Date of Patent: Jul. 4, 1989

[54] DRAWBAR

[76] Inventor: Edwin A. Frost, Rte. 4, Box 132, Maquoketa, Iowa 52060

[21] Appl. No.: 195,892

[22] Filed: May 19, 1988

[51] Int. Cl.$^4$ ............................................. B60D 1/10
[52] U.S. Cl. .................................. 280/411.1; 172/202
[58] Field of Search ................... 280/411 R, 413, 472, 280/473, 411.1; 172/182, 201, 202, 314

[56] References Cited

U.S. PATENT DOCUMENTS

| | | | |
|---|---|---|---|
| 1,237,546 | 8/1917 | Orud | 280/472 |
| 1,467,573 | 9/1923 | Engelhardt | 280/473 |
| 2,274,767 | 3/1942 | Zink et al. | 280/472 |
| 3,263,757 | 8/1966 | Kaster | 172/202 |
| 4,687,065 | 8/1987 | Cope et al. | 172/202 X |

Primary Examiner—Charles A. Marmor
Assistant Examiner—Michael Mar
Attorney, Agent, or Firm—Robert O. Richardson

[57] ABSTRACT

A drawbar for pulling a cultipacker for compacting loose earth. The drawbar has a main pulling beam for attachment at a forward end to a plow being drawn by a tractor and at a rearward end to the cultipacker. The drawbar includes an extendible arm connected at one end to the plow and pivotally connected at it's opposite end to the main pulling beam and an extendible leg pivotally connected between the extendible arm and the main pulling beam adjacent it's rearward end thereof.

2 Claims, 1 Drawing Sheet

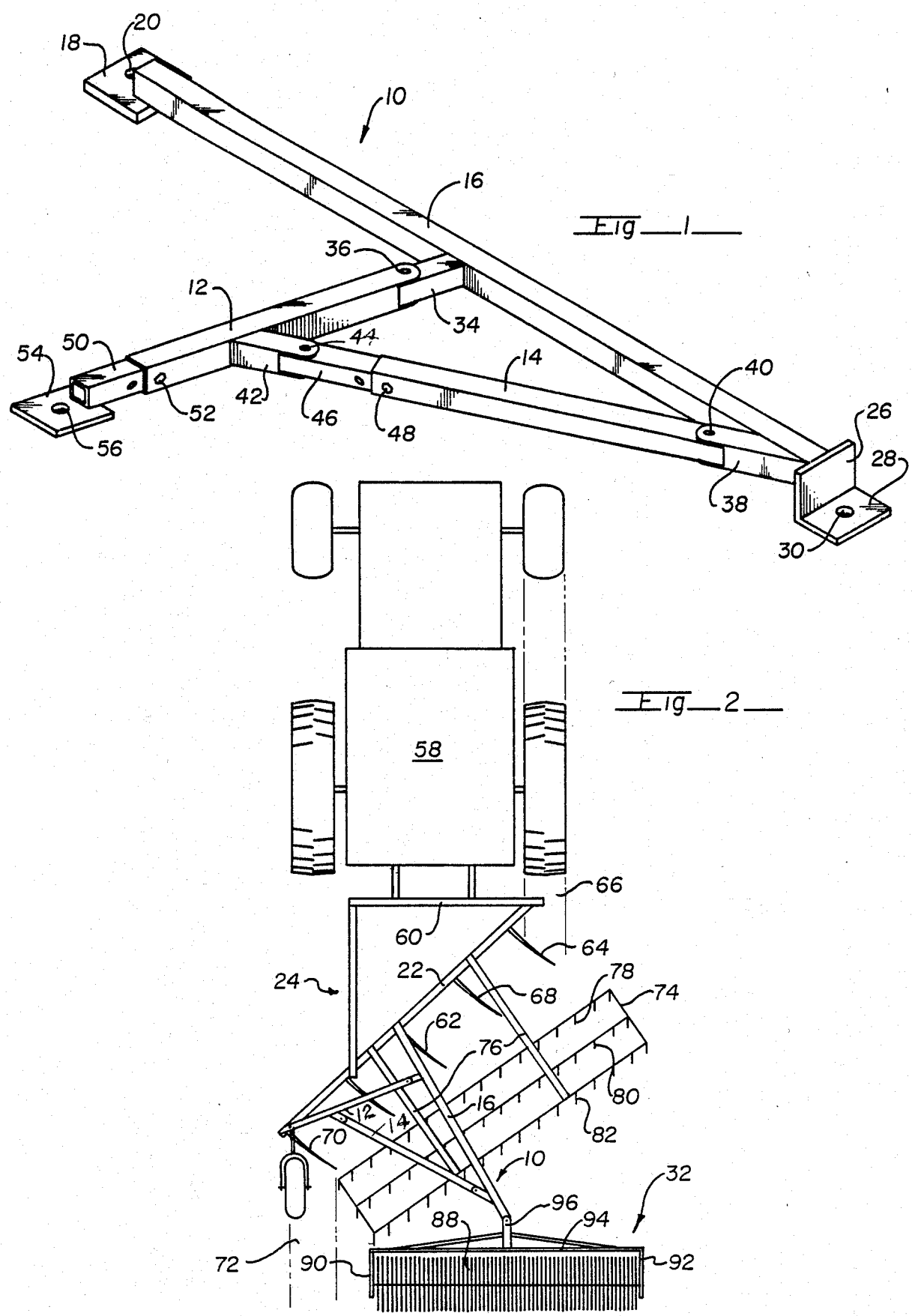

DRAWBAR

FIELD OF INVENTION

This invention is in the field of pulling devices and in particular an attachment for pulling a plurality of farming implements behind a pulling device such as a farm tractor.

BACKGROUND OF PRESENT INVENTION

Tractors have long been used to pull earth moving implements and grain farming devices such as plows, discs, harrows, seed planters and similar items. If desired, several such items could be performed at the same time. They also could be placed side by side behind the tractor so a wider pass would be made. These multiple uses result in more work being accomplished in a shorter time and greater efficiency in farming operations.

SUMMARY OF THE INVENTION

In accordance with the present invention a drawbar is provided for pulling a cultipacker behind a plow and harrow which are attached to and pulled by a tractor. This drawbar consists of a main pulling beam terminating in an elevation plate that fastens to the cultipacker and at the other end to the I-beam of a plow. Two length adjustable bars are pivotally connected to each other and to the main pulling beam. The end of one is mounted on the mold board of the plow. These bars, when adjusted in length and direction, properly position the cultipacker laterally behind the harrow and plow so that the open furrow behind the plow blade on the left remains exposed and the open furrow on the right has been closed and treated for planting.

BRIEF DESCRIPTION OF THE DRAWINGS

FIG. 1 is a perspective view of the drawbar, and
FIG. 2 is a plan view showing the relationship of the several farming implements that permit a one pass preparation of the soil for planting by use of the drawbar of the present invention.

DETAILED DESCRIPTION OF PREFERRED EMBODIMENT

Reference is now made to FIG. 1 wherein is shown the drawbar 10 comprising an arm 12, leg 14 and main pulling beam 16. The main pulling beam preferably is made of square tubing with a mounting plate 18 welded to its forward end. This plate has an opening 20 therein for bolting the plate 18 to the mold board 22 of the plow 24, shown in FIG. 2. The rear end of beam 16 has an elevation plate 26 welded to it and extending downwardly. This plate has a horizontal lower lip 28 with opening 30 therein for fastening of cultipacker 32, shown in FIG. 2.

About midway along beam 16 and extending outwardly is a pivot post 34 to which arm 12 is pivotally mounted at pivot point 36. A second pivot post 38 is welded at an angle to the rear end of main pulling beam 16. Leg 14 is pivotally mounted to it at pivot point About midway along arm 12 and welded angularly thereto is another pivot post 42. This post has pivoted to it at 44 a smaller size square tubing 46 that will telescope within the end of leg 14. Arm 12 also has an extender 50 of smaller tubular size to telescope into the end of arm 12. Extension bolt 52 maintains extender 50 and arm 12 at predetermined length. Extender 50 has a horizontal mounting plate 54 with opening 56 for fastening onto the mold board 22 of plow 24 in FIG. 2.

It may be noted that the distance between opening 56 in mounting plate 54 and opening 20 in mounting plate 18 may be varied to mount the drawbar on various kinds and brands of plows. This is done by pivoting arm 12 about pivot 36 and adjusting the length of extender 50 on arm 12. This adjustment and adjustment of extender 46 on leg 14 will also align main pulling beam 16 so that the cultipacker 32 in FIG. 2 is properly positioned laterally behind the tractor 58 in FIG. 2.

Reference is now made to the plan view in FIG. 2. Here tractor 58 is shown traveling upwardly with the unworked field on its left and the prepared soil on the right. Behind the tractor 58 is a 5 blade plow 24. This consists of a laterally extending I-beam 60 attached to the rear of tractor 58, with a mold board 22 having 5 plow blades 62 thereon. These blades are approximately 16" apart. The plow blades and mold board extend rearwardly from right to left so that the upper right blade 64 scoops out the first 16" path of dirt and moves it to the right. This fills the adjacent open furrow 66 from a previous pass. The second blade 68, in turn, moves its path of dirt 16" to the right to fill the furrow caused by the first blade 64. The last blade 70 moves its path of dirt 16" to the right, leaving an open furrow 62 behind it. This open furrow will be covered by the first blade 64 on the next pass over the field.

A harrow 74 is attached behind the plow 24 by the harrow tongues 76 attached to the mold board 22 of the plow. This harrow typically has 3 rows of downwardly extending teeth 78, 80, 82 that break up the plowed ground behind the plow 24. Tongues 76 properly position the harrow laterally behind the plow. As shown, the front row of teeth extend from the open furrow behind the last blade 70 to beyond the furrow 66 now filled by the first blade 64 on the right. Because of its angular position, the harrow teeth in the second and third rows extend to the right about 6 inches even more to provide continuity of soil treatment between the adjacent passes.

The cultipacker 32 consists of a row of wheels 88 of uniform diameter between frame ends 90, 92 which are connected by a cross frame 94 having a pull tongue 96 extending forwardly thereon. Various amounts of weights on the cross frame 94 determine the amount of compaction of the soil run over by the cultipacker wheels. When this cultipacker 32 is properly attached to the plow 24 and operates behind the harrow 74, the soil is properly prepared for planting with a single pass over the field. Saddle tanks, not shown, for fertilizer and pesticides can be added, as desired, to complete all pre-planting operations.

The proper positioning of the cultipacker 32 requires the use of the drawbar 10 of the present invention. This drawbar, shown in more detail in FIG. 1, is fastened by mounting plate 18 on main pulling beam 16 to mold board 22 of plow 24. Mounting plate 54 is fastened to mold board 22 of plow 24 and extender 50 on arm 12 is adjusted accordingly. At the same time leg 14 must be adjusted in length with extender tube 46 to permit the proper lateral positioning of the lip 28, i.e., the connection with the pull tongue 96 of the cultipacker 32. The proper lateral positioning of the cultipacker is that the left frame end 90 must follow the inner edge of furrow 72 which was left open until the next pass. The cultipacker 32 is not angularly oriented as the plow 24 and harrow 74 are. Instead, it extends laterally to the right about 6" beyond the open plow furrow 66 that had just been covered and harrowed. This proper positioning of the cultipacker is accomplished by the proper lateral positioning of lip 28 on drawbar 10 to which the cultipacker is fastened. Adjustment of the extensions to arm 12 and leg 14 of the drawbar 10 will maintain the cultipacker 32 in this desired position.

While the foregoing embodiment has been described as a means of teaching the present invention in such manner that one skilled in the art can practice the invention, it is to be understood that the invention is not limited thereby and that such additions, alterations, modifications and improvements that occur to one skilled in the art are to be considered as part of this invention as set forth in the following claims.

What is claimed is:

1. A drawbar for pulling a cultipacker for compacting loose earth, the drawbar being adapted to be attached to a plow having a laterally extending beam for attachment to a tractor and an elongated mold board with a plurality of plow blades attached thereto, the mold board being secured at one end to the laterally extending beam and extending rearwardly and laterally therefrom, said drawbar comprising a main pulling beam having first connecting means at a forward end for connecting said main pulling beam to said mold board, with said main pulling beam extending rearwardly over said plow, and second connecting means at a rearward end of said main pulling beam for connecting said cultipacker thereto, an extendible arm member, means for pivotally attaching one end of said arm member to said main pulling beam between said forward and rearward ends thereof, means for connecting the opposite end of said arm member to said mold board at a location rearwardly of the connection between said main pulling beam and said mold board, an extendible leg member, means for pivotally attaching one end of said leg member to said main pulling beam adjacent said rearward end thereof, and means for pivotally attaching the opposite end of said leg member to said arm member at a location between the ends of said arm member.

2. A drawbar as set forth in claim 1 wherein said second connecting means comprises a plate secured to the rearward end of said main pulling beam, said plate including a lip portion for connecting said cultipacker thereto.

* * * * *